No. 664,794. Patented Dec. 25, 1900.
J. F. WALLACE.
DEVICE FOR PREVENTING COWS FROM KICKING.
(Application filed Oct. 19, 1900.)
(No Model.)
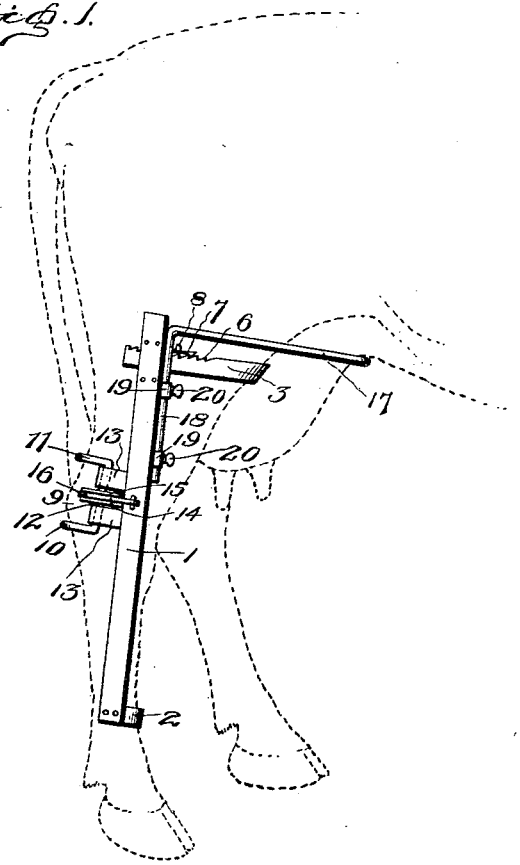
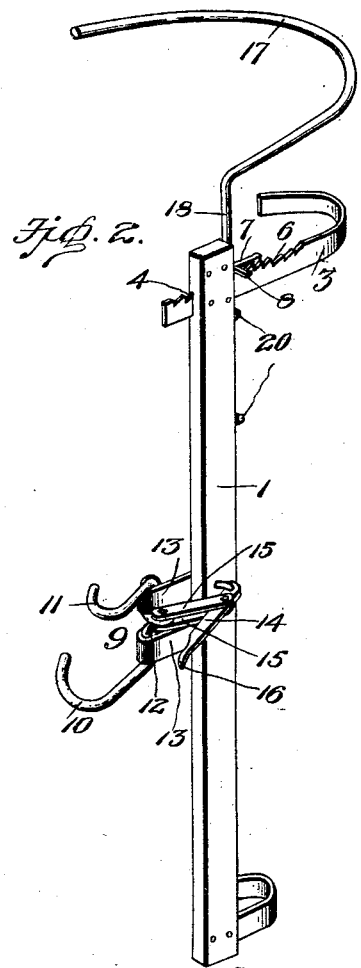
Witnesses
Inventor
J. F. Wallace
By H. B. Willson & Co
Attorneys

UNITED STATES PATENT OFFICE.

JOHN F. WALLACE, OF ASHLAND, OREGON.

DEVICE FOR PREVENTING COWS FROM KICKING.

SPECIFICATION forming part of Letters Patent No. 664,794, dated December 25, 1900.

Application filed October 19, 1900. Serial No. 33,584. (No model.)

*To all whom it may concern:*

Be it known that I, JOHN F. WALLACE, a citizen of the United States, residing at Ashland, in the county of Jackson and State of Oregon, have invented certain new and useful Improvements in Devices for Preventing Cows from Kicking; and I do declare the following to be a full, clear, and exact description of the invention, such as will enable others skilled in the art to which it appertains to make and use the same.

The invention relates to a device for preventing cows from kicking while being milked.

The object of the invention is to provide a device of this character which shall be simple of construction and capable of being conveniently and expeditiously applied to the hind leg of a cow and which will effectually prevent the animal from raising her foot and getting it in a pail or making a movement calculated to upset the pail.

With this and other objects in view the invention consists in certain features of construction and combination of parts, which will be hereinafter more fully set forth.

In the accompanying drawings, Figure 1 is a side elevation of my device, showing it applied. Fig. 2 is a perspective view of the device removed; and Fig. 3 is an enlarged view of the upper end of the bar, showing the manner of adjusting the upper clip.

Referring to the drawings, 1 denotes a bar of suitable length and thickness. Secured to the lower end of the bar is a clip 2, which is adapted to engage the hock of the animal, and secured to the upper end of the bar is a similar clip 3, but of larger dimension, which is adapted to engage the thigh of the animal. This clip is made laterally adjustable, so as to accommodate animals with different-sized thighs, and this adjustment may be effected in any manner, preferably by mounting one arm of the clip in a groove 4, formed on the inner side of the bar and holding it in said groove by straps 5. The upper end of the bar may be provided with teeth 6, with which is engaged a spring-ratchet 7, having a thumb-piece 8, projecting outwardly to enable the ratchet to be lifted when it is desired to adjust the clip.

9 denotes an intermediate clip, which consists of two hooks 10 and 11, the former of which is larger than the latter. Of these hooks the hook 10 is adapted to engage the leg of the animal below its hock, and the hook 11 is adapted to engage the leg of the animal above the hock. These hooks are connected to or formed integral with a crank-shaft 12, mounted in strap-bearings 13, secured to the inner side of the bar 1, and by rotating this crank-shaft the hooks may be made to engage with or disengage from the leg, as the case may be. The preferred means for operating the crank-shaft is shown in the accompanying drawings, and consists of a lever 14, pivoted to the outer face of the bar 1 and connected by parallel links 15 to the crank of the shaft 12. The free end of the lever 14 is provided with a curved extension 16, which when the hooks 10 and 11 are in position about the hock of the cow will lie against the crank and between the parallel links 15, in which position the pivotal points of the lever with the bar and with the links and the pivotal points of the links with the crank-shaft will be in a straight line or at a dead-center, thus securely locking the hooks 10 and 11 in position about the leg of the animal. When it is desired to unlock or remove the hooks 10 and 11 from the animal's leg, the free end of the lever is grasped and swung outward, thus swinging the hooks in the position shown in Fig. 2 of the drawings.

If desired, I may provide the upper end of the bar 1 with a vertically-adjustable bow 17, having a vertically-disposed stem 18, mounted in bearings 19, secured to the upper end of the bar 1 and made adjustable by set-screws 20. The bow 17 passes across the belly of the cow immediately in advance of the udder, and the free end of the lever lies between the udder and thigh of the leg opposite to that to which the device is attached.

From the foregoing description, taken in connection with the accompanying drawings, the construction, operation, and advantages of my invention will be readily understood without requiring an extended explanation.

The device is exceedingly useful for the purpose for which it is designed and may be placed upon the market at a comparatively small cost.

Various changes in the form, proportion, and the minor details of construction may be resorted to without departing from the principle or sacrificing any of the advantages of this invention.

Having thus fully described my invention, what I claim, and desire to secure by Letters Patent, is—

1. In a device of the character described, the combination with a bar having upper and lower clips and means intermediate its ends for engaging the hock of the animal, and a bow supported at the upper end of the bar and adapted to pass under the belly of the animal in advance of the udder, substantially as set forth.

2. In a device of the character described, the combination with a bar having upper and lower clips and means for laterally adjusting the upper one, of means intermediate its ends for engaging the hock of the animal, and a bow supported at the upper end of the bar and adapted to pass under the belly of the animal in advance of the udder, substantially as set forth.

3. In a device of the character described, the combination with a bar provided with clips at its upper and lower ends for the purpose set forth, of a hook having a laterally-swinging connection with said bar intermediate its ends, a pivoted lever, and links connecting the lever with said hook, substantially as set forth.

4. In a device of the character described, the combination with a bar having clips at its upper and lower ends, of a crank-shaft located intermediate the ends of the bar, hooks connected to said crank-shaft, a lever, and a link connecting said lever with said crank-shaft, substantially as set forth.

5. In a device of the character described, the combination with a bar having upper and lower clips and means for laterally adjusting the upper one, of a hook supported by the bar intermediate its ends for engaging the hock of the cow, the upper clip being mounted to slide in a groove formed in the face of said bar and provided with ratchet-teeth, and a ratchet carried by said bar and adapted to engage said teeth, said ratchet having a finger or handpiece projecting therefrom, substantially as set forth.

In testimony whereof I have hereunto set my hand in presence of two subscribing witnesses.

JOHN F. WALLACE.

Witnesses:
G. F. BILLINGS,
MILES CORY.